(12) United States Patent
Gould et al.

(10) Patent No.: US 12,513,001 B2
(45) Date of Patent: Dec. 30, 2025

(54) BLOCKCHAIN VERIFICATION OF DIGITAL CONTENT ATTRIBUTIONS

(71) Applicant: Unstoppable Domains Inc., Las Vegas, NV (US)

(72) Inventors: Matthew Everett Gould, Reno, NV (US); Lisa Seacat DeLuca, Bozeman, MT (US); Braden River Pezeshki, Reno, NV (US)

(73) Assignee: Unstoppable Domains Inc., Las Vegas, NV (US)

( * ) Notice: Subject to any disclaimer, the term of this patent is extended or adjusted under 35 U.S.C. 154(b) by 457 days.

(21) Appl. No.: 17/939,729

(22) Filed: Sep. 7, 2022

(65) Prior Publication Data
US 2024/0097912 A1 Mar. 21, 2024

(51) Int. Cl.
*H04L 9/32* (2006.01)
*H04L 9/00* (2022.01)

(52) U.S. Cl.
CPC .......... *H04L 9/3247* (2013.01); *H04L 9/3236* (2013.01); *H04L 9/50* (2022.05)

(58) Field of Classification Search
CPC ....... H04L 9/3247; H04L 9/3236; H04L 9/50; H04L 2209/60
See application file for complete search history.

(56) References Cited

U.S. PATENT DOCUMENTS

| | | | |
|---|---|---|---|
| 9,418,050 B1* | 8/2016 | Brewster | G06F 16/958 |
| 12,132,820 B1* | 10/2024 | Sheth | H04L 9/3239 |
| 2019/0090023 A1* | 3/2019 | Lee | H04N 21/8456 |
| 2019/0163887 A1 | 5/2019 | Frederick | |
| 2019/0179861 A1 | 6/2019 | Goldenstein | |
| 2020/0044828 A1 | 2/2020 | Rice | |
| 2020/0084045 A1* | 3/2020 | Cohen | H04L 9/14 |
| 2023/0334472 A1* | 10/2023 | Pene | G06Q 20/0655 |

\* cited by examiner

*Primary Examiner* — Wasika Nipa
*Assistant Examiner* — Edgar W Xie
(74) *Attorney, Agent, or Firm* — Van Pelt, Yi & James LLP

(57) ABSTRACT

An identification of digital content to be verified for an attribution to an associated entity is received. Using a processor, a contact identifier associated with the associated entity is determined. Using the contact identifier, verification of the attribution for at least a portion of the digital content is requested. An indication associated with whether the attribution has been verified using a cryptographic signature associated with the associated entity is received. The indication is provided in association with at least the portion of the digital content.

20 Claims, 11 Drawing Sheets

FIG. 10

BLOCKCHAIN VERIFICATION OF DIGITAL CONTENT ATTRIBUTIONS

BACKGROUND OF THE INVENTION

Content including digital content such as video, social media posts, and articles, often references different sources of authority. The sources can be individuals as well as organizations such as companies or governments. The content can rely on these sources for the accuracy of the reported statements. For example, a fact or a quote in an article can be attributed to a particular individual or a video may include a user's personal account on an event.

BRIEF DESCRIPTION OF THE DRAWINGS

Various embodiments of the invention are disclosed in the following detailed description and the accompanying drawings.

FIG. 10 is a diagram illustrating an embodiment of a user interface for an article annotated with interactive verified attributions.

DETAILED DESCRIPTION

Figure 1:
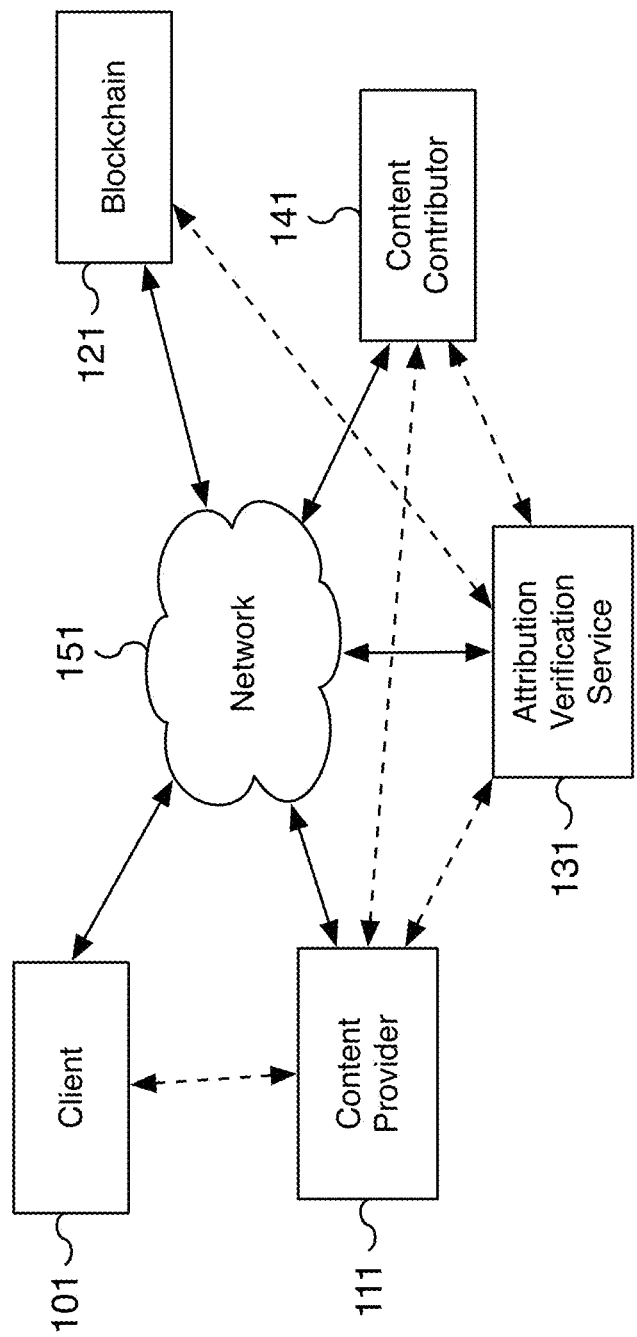
FIG. 1 is a block diagram illustrating an embodiment of a digital content attribution platform using blockchain verifications.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Blockchain verification of digital content attributions is disclosed. Using the disclosed techniques and systems, content attributions can be verified using blockchain verifications. For example, digital content with attributions can be verified by the entities referenced by the attributions using blockchain-based cryptographic signatures. In various embodiments, the verification is performed using a content attribution verification service. For example, the digital content is analyzed to identify attributions and the entity referenced by each attribution. Using a content attribution verification service, a request to verify the attribution is provided to the referenced entity. In some embodiments, the referenced entity is contacted via a contact identifier found in an entity database or registry. In response to the attribution verification request, the entity provides a response to the attribution, such as a declaration that the attribution is true, a declaration that the attribution is false, and/or another response to the attribution. In various embodiments, as part of the entity's response, the entity also provides a cryptographic wallet signature. For example, the referenced entity can sign its response message using a cryptographic private key associated with a blockchain address. Once the signature is verified, the entity's response can be used to annotate the digital content with a verified attribution. The included annotations for the digital content indicate to users of the digital content that the attributions have been verified by the entity referenced. In some embodiments, the verified attributions are displayed with additional information such as the name, a contact identifier, and a date for the attribution verification along with any responses by the referenced entity. In some embodiments, the verified attribution provides other details such as a profile page or link to a profile page of the referenced entity. The referenced profile page can provide background information on the referenced entity including a background, a biography, contact information, and/or a reputational score, among other information related to the referenced entity.

In some embodiments, an identification of digital content to be verified for an attribution to an associated entity is received. For example, an identifier for or a reference to a digital asset such as an article, video, audio, social media post, or another form of digital content is received. In various embodiments, the digital content is text-based, audio-based, image-based, video-based, and/or a combination of different forms of media. The identification is received to identify the digital content that includes one or more attributions to be verified. Each attribution in the digital content is associated with an entity, and that entity will be requested to verify the accuracy of the corresponding attribution. In some embodiments, a contact identifier associated with the associated entity is determined using a processor. For example, the one or more entities referenced in the digital content are identified and mapped to corresponding contact identifiers using a processor. In particular embodiments, the digital content is analyzed to automatically identify attributions and their associated entities, and a contact identifier for each identified entity is determined. For example, the contact identifier can be determined by looking up the entity in an identity database or registry. The identity database or registry can be hosted by a third-party identity server and/or stored on a blockchain or public ledger. Example identifiers can include a social media account, an email address, a username, a phone number, and/or a non-fungible token (NFT) identifier, among other entity identifiers associated with and/or registered for an entity. For example, an entity's contact identifier may be a content contributor's social media username or an NFT domain name.

In some embodiments, verification of the attribution for at least a portion of the digital content is requested using the contact identifier. For example, the entity is notified of the attribution verification request using the determined contact identifier. The request can include a reference to the digital content as well as references to the portions of the content attributed to the entity. For example, an article can include the quotes and/or facts in the article that are attributed to the entity. As another example, a video or audio interview can include a reference to the digital content along with timestamps corresponding to the entity's appearance in the digital content. In some embodiments, the request includes a transcript of the contributions by or references to the entity. In some embodiments, an attribution for verification includes scenarios where an entity is mentioned or referenced in the digital content, for example, using a hashtag or another tagging or naming system. The use of the mention and/or reference may indicate that the digital content references or generally relates to the entity without necessarily attributing specific facts or quotes to the entity. The entity receives the attribution verification request and can determine whether to verify the accuracy of the attribution. In various embodiments, the entity can verify the attribution by providing a variety of responses including declaring that the attribution is true, the attribution is false, providing a "no comment" to the attribution, and/or providing a response to the attribution, among other appropriate responses.

In some embodiments, an indication associated with whether the attribution has been verified using a cryptographic signature associated with the associated entity is received. For example, the entity provides a signature associated with a blockchain address, such as a public cryptographic address or public cryptographic key stored on a blockchain. The signature is provided by the entity using the corresponding private key for the public cryptographic address or public key. In some embodiments, the signature is provided by utilizing a cryptographic wallet to sign an attribution verification request. Once the signature is received, the signature is verified to be a valid signature. In some embodiments, the validated signature and/or a related attribution validation result is written to the blockchain.

In some embodiments, the indication is provided in association with at least the portion of the digital content. For example, the appropriate portions of the digital content can be annotated using the received verified attributions. Once annotated, the annotated digital content can be provided to content consumers, for example, by displaying or playing the annotated digital content to viewers. When shown with the digital content, verified attributions can include a verified attribution user interface component, such as a verified icon or audio cue. In some embodiments, content consumers can interact with the verified attribution annotations, for example, to display additional details of the verifications and the entity providing the verification. For example, a verified attribution annotation can include a profile photo of the associated entity and a link to the associated entity's profile, such as a social media profile. In some embodiments, the annotations include attributions that are denied and/or unverified. For example, an entity can choose to verify that the attribution is incorrect, and the annotated digital content will display a false attribution indicator when and/or where the corresponding digital content is presented to content consumers.

FIG. 1 is a block diagram illustrating an embodiment of a digital content attribution platform using blockchain verifications. In the example shown, the digital content attribution platform includes client 101, content provider 111, blockchain 121, attribution verification service 131, content contributor 141, and network 151. Client 101 is a network client used to access content provider 111. Content provider 111 hosts digital content such as articles, video, and/or audio, among other digital content with content attributions verified using attribution verification service 131. Attribution verification service 131 is a blockchain content attribution verification service and utilizes blockchain 121 to verify contributions from entities such as content contributor 141. In the example shown, portions of digital content hosted by content provider 111 are attributed to content contributor 141. In response to an attribution verification request by content provider 111, attribution verification service 131 contacts content contributor 141 to verify the attribution. Content contributor 141 verifies the attribution by providing a signature using a private key associated with a blockchain address. The blockchain address is stored using blockchain 121 and can correspond to a public cryptographic address and/or public cryptographic key.

In the diagram of FIG. 1, client 101, content provider 111, blockchain 121, attribution verification service 131, and content contributor 141 are communicatively connected via network 151. In some embodiments, network 151 is the Internet. The solid bi-directional arrows between each of client 101, content provider 111, blockchain 121, attribution verification service 131, and content contributor 141 to network 151 represent network connectivity via network 151. The dashed bi-directional arrows between the different components of FIG. 1 correspond to two different network endpoints of a network connection established via network 151. The connections represented by the dashed bi-directional arrows correspond to network connections used for providing and verifying content attributions for digital content hosted by content provider 111, accessed by client 101, verified using attribution verification service 131, and attributed to content contributor 141.

In some embodiments, client 101 is a network client used to consume digital content from content providers such as content provider 111. For example, client 101 can be a computing device such as a laptop, mobile device, desktop, or another network computing client capable of consuming digital content. In various embodiments, using a web browser or another media client, client 101 can view articles, video, audio, and other digital assets provided by content provider 111 with verified attributions to content contributors such as an entity associated with content contributor 141. When accessing the attributed digital content of content provider 111, client 101 can be provided with additional details of an attribution including details of the attribution verification and the attribution, such as a profile of the entity to which the content is attributed to.

In some embodiments, content provider 111 is an application service that provides digital content with verified attributions. For example, the provided digital content is annotated with attributions that have been verified using blockchain verifications. Verified annotations can include a verified attribution user interface component, such as a verified icon or audio cue, to denote when an attribution has been verified (or not verified). In some embodiments, a client can interact with the annotations to reveal additional annotation details such as details about the attribution, verification of the attribution, and the entity that verified the attribution. For example, content provider 111 can provide the client with a link or reference to a profile of the entity that verified the attribution.

In some embodiments, blockchain 121 is a blockchain that is utilized to store information for different entities including an entity's public cryptographic address or cryptographic public key. For example, an individual can store the user's public cryptographic address on blockchain 121. Similarly, an organization such as a company, division of an organization, an agency, or another group can store the organization's public cryptographic address or cryptographic public key on blockchain 121. In various embodiments, blockchain 121 is a public blockchain and/or functions as a public ledger. In various embodiments, blockchain 121 also stores a registry to map an entity to its entity blockchain address. For example, user's name, social media account, NFT identifier, or another identifier can be mapped to the user's public blockchain address or public key. In some embodiments, more than one public address or key is stored for each entity. For example, blockchain 121 can store one or more authentication records that specify one or more additional cryptographic public keys, addresses, or alternative verification methods for verifying an attribution associated with the entity and its entity identifier. In some embodiments, blockchain 121 may be a multi-layer blockchain. In various embodiments, the public cryptographic addresses or public keys stored using blockchain 121 are used to validate requested signatures for content attribution verification requests.

In some embodiments, attribution verification service 131 is a service that accepts attribution verification requests for attributions in digital content and returns whether the attributions have been verified. For example, content provider 111 requests that attribution verification service 131 verify attributions in digital content hosted by content provider 111. Attribution verification service 131 notifies the entities who are the subject of the attributions and requests that each entity verify its attribution, for example, by providing a cryptographic signature in response to a content attribution verification request. Attribution verification service 131 verifies the provided signature against a public cryptographic address, such as a blockchain address of blockchain 121. In some embodiments, attribution verification service 131 determines an entity identifier in order to notify the entity and can further map an entity to its public cryptographic address and/or public cryptographic key to verify the entity's signature. In various embodiments, in response to the attribution verification request to a content contributor such as an entity associated with content contributor 141, attribution verification service 131 receives a response from the entity that verifies whether the attribution is true, the attribution is false, or another response to the attribution along with the entity's signature. Once the response including the signature is verified, attribution verification service 131 provides content provider 111 with a content attribution verification result.

In some embodiments, attribution verification service 131 can scan digital content for attributions and determine the appropriate entities from which to request attribution verification. For example, attribution verification service 131 can scrape an article for attributions and determine an entity identifier for each of the entities referenced in attributions. As another example, attribution verification service 131 can perform image and/or audio recognition on video and audio, respectively, to determine an entity identifier for the identified individuals or organizations in the media. Using a determined entity identifier, attribution verification service 131 can request that the corresponding entity verify its identified attribution in the digital content. In some embodiments, the request includes a reference to the digital content and references to the portions of the media designated by the attribution.

In some embodiments, content contributor 141 is a network device associated with an entity that is referenced by digital content hosted and/or provided by content provider 111. For example, the entity may be an individual or an organization and the reference may be a contribution, mention, association, or another form of attribution to the entity in the digital content. In some embodiments, the content contributor 141 is a mobile device, desktop computer, laptop computer, tablet, or another networked computing device that the entity can utilize to provide a digital signature to verify an attribution verification request. For example, the entity may utilize a cryptographic wallet using content contributor 141 to sign an attribution verification request from attribution verification service 131 for digital content hosted by content provider 111. The cryptographic wallet used for the signature is associated with blockchain 121 and configured using a public cryptographic address and corresponding cryptographic public/private keys.

In various embodiments, the components shown in FIG. 1 may exist in various combinations of hardware machines. Although single instances of some components have been shown to simplify the diagram, additional instances of any of the components shown in FIG. 1 may exist. For example, blockchain 121 and attribution verification service 131 can each include one or more servers including distributed servers. For example, some servers of attribution verification service 131 may include web application servers, machine learning training servers, machine learning inference servers, and/or database servers. As additional examples, client 101 is just one example of a potential client for consuming digital content, content provider 111 is just one example of an application service for providing digital content, and content contributor 141 is just one example of a content contributor for verifying an entity's attribution in digital content. Additional instances of each may also exist. In some embodiments, components not shown in FIG. 1 may also exist.

Figure 2:
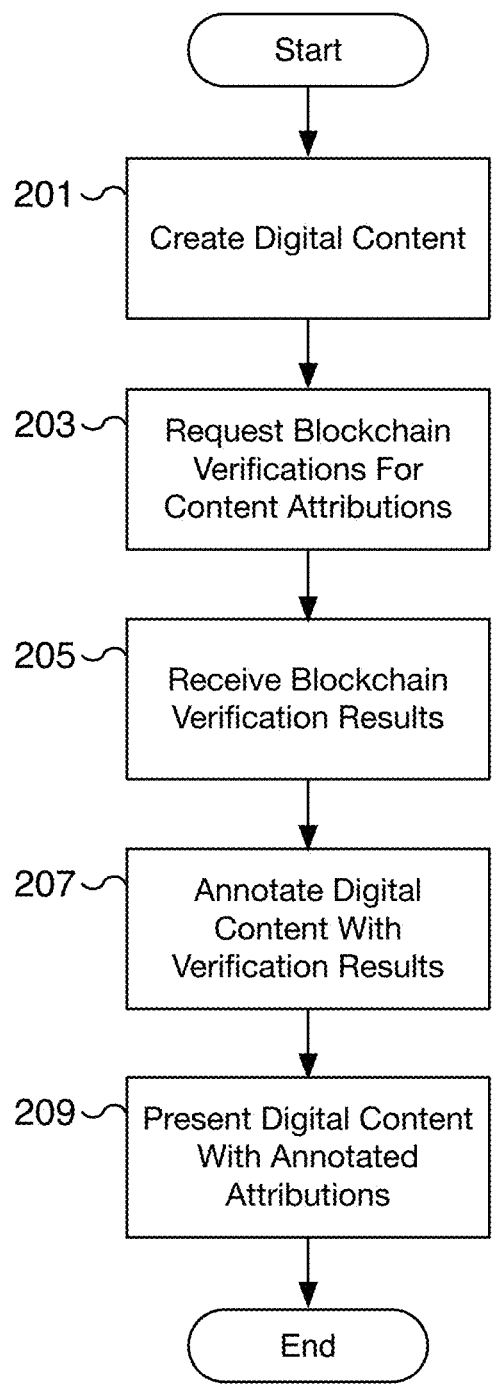
FIG. 2 is a flowchart illustrating an embodiment of a process for providing digital content with verified attributions using blockchain verifications.

FIG. 2 is a flowchart illustrating an embodiment of a process for providing digital content with verified attributions using blockchain verifications. For example, using the process of FIG. 2, a content provider hosting digital content can verify attributions associated with the digital content using a content attribution verification service. Based on the results received from the content attribution verification service, the digital content can be annotated to provide more details about each annotation including whether an annotation is verified. As users view the annotated content, they can interact with the annotated attributions to determine how the entity referenced has responded to an attribution verification request. In some embodiments, the process of FIG. 2 is performed by a content provider such as content provider 111 of FIG. 1 to verify content using an attribution verification service such as attribution verification service 131 of FIG. 1.

At 201, digital content is created. For example, a digital asset such as an article, video, audio, social media post, or another form of digital content is created with attributions. The attributions in the digital content created can reference one or more different entities, for example, as subjects of the content, as references for facts or events mentioned in the content, or for having another relationship with the content. In some embodiments, the attributions to entities can relate to a visual and/or audio appearance of the entity in the content (such as a video or audio segment), the inclusion of quotes by the entity, the inclusion of facts provided the entity, references and/or associations to the entity within portions of the content, and/or another association of the entity with the digital content. In various scenarios, different types of attributions are possible for associating an entity with the digital content including explicitly mentioning an entity within the digital content, such as an article attributing a quote or fact to the entity, as well as mentioning or referencing an entity in association with the digital content using a hashtag or another tagging or naming system.

At 203, blockchain verifications are requested for content attributions. Using the digital content created at 201, one or more requests to verify the attributions within the digital content are made. In various embodiments, one or more content attribution verification requests are made to a blockchain-based content attribution verification service. For example, the request for verification is a blockchain verification and requires that the entity verifying the attribution utilize a blockchain or similar public ledger, for example, for storing a public cryptographic address. In some embodiments, the entity verifying the attribution must provide a signature associated with a blockchain.

In some embodiments, the request includes a reference to the digital content such as a link to where the content is hosted. In some embodiments, the request may embed the digital content, such as an article, within the content attribution verification request. As part of the request, the blockchain-based content attribution verification service is asked to identify attributions in the digital content and/or the entities referenced in identified attributions before verifying the attributions with the identified entities referenced in the attributions. In some embodiments, one or more attributions and/or entities referenced by an attribution have already been identified and the attribution verification request includes one or more entity identifiers along with a reference to the attribution for verification.

At 205, blockchain verification results of content attributions are received. For example, the results to the blockchain verifications requested at 203 are received. In some embodiments, a verification result for an attribution indicates whether the attribution has been verified by the entity referenced in the attribution. In some embodiments, the result includes additional details such as a response by the entity, such as a declaration by the entity that the attribution is true, a declaration by the entity that the attribution is false, the type of contribution or role of the referenced entity, or another response by the entity to the attribution. In some embodiments, a blockchain verification result may indicate that the entity referenced in an attribution did not verify the attribution or that the identified entity failed when attempting to verify the attribution.

At 207, digital content is annotated with verification results. For example, the digital content is annotated to show the results from attribution verifications. In some embodiments, attributes in the digital content that are verified are annotated with a verified attribution user interface component, such as a verified icon or audio cue. In various embodiments, the annotation for a content attribution is a visual and/or audio modification to the digital content. For example, the digital content can be modified with respect to a content attribution to include an icon, a styling treatment, an annotation in the margin of the digital content, an annotation embedded in a segment of the digital content, and/or an annotation displayed any time the referenced entity is shown or heard. In some embodiments, the verified attribution annotation can include a profile photo and/or profile link of the entity verifying the attribution. In some embodiments, the annotation can include a comment provided by the entity verifying the attribution and/or includes a response detailing whether the attribution is true, whether the attribution is false and/or denied, or another response by the entity referenced in the attribution. In some embodiments, non-verified attributions are also shown with a corresponding non-verified attribution user interface component, such as a non-verified icon or audio cue.

At 209, digital content with annotated attributions is presented. For example, the digital content annotated at 207 is hosted and made available to viewers. In some embodiments, users of media clients can view the digital content and interact with the annotations. For example, when a user selects an annotation, additional details of the attribution including annotation details such as details about the attribution, verification of the attribution, and/or the entity that verified the attribution are provided to the user.

Figure 3:
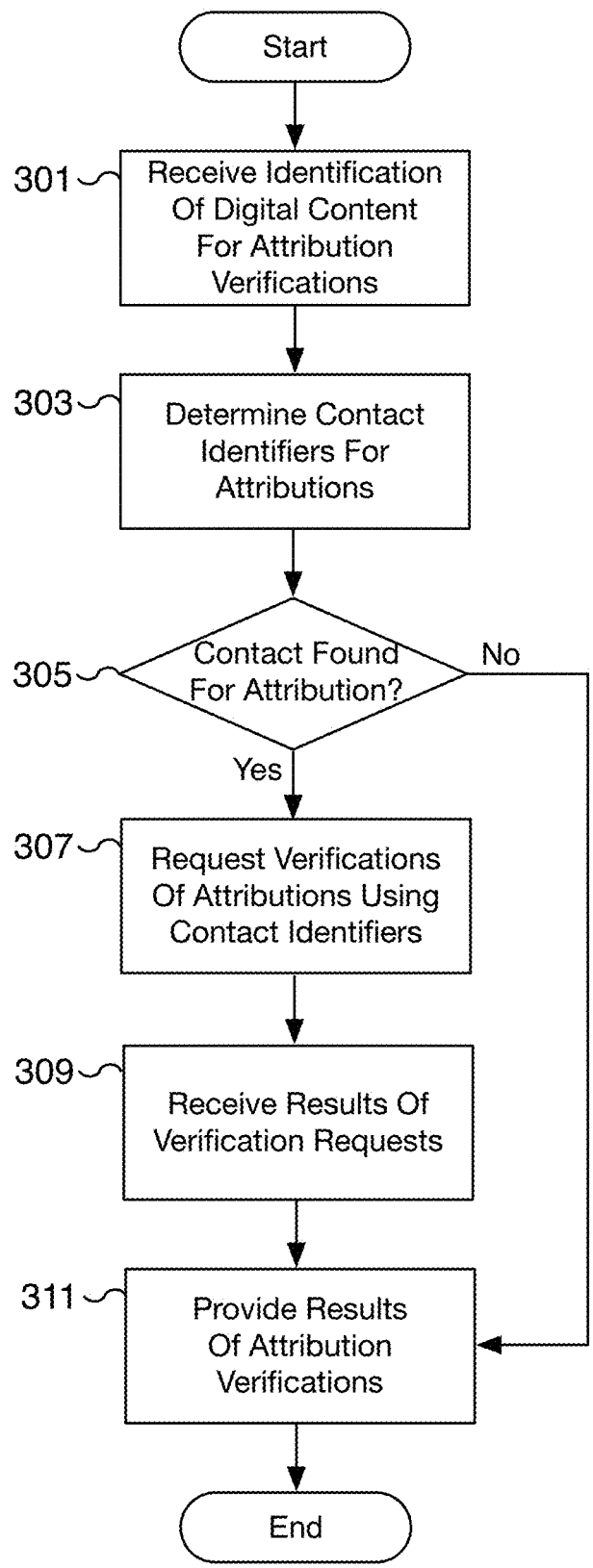
FIG. 3 is a flowchart illustrating an embodiment of a process for performing content attribution verification using blockchain verifications.

FIG. 3 is a flowchart illustrating an embodiment of a process for performing content attribution verification using blockchain verifications. For example, using the process of FIG. 3, a content attribution verification service can verify an attribution associated with a digital asset by requesting verification from the entity referenced in the attribution. In various embodiments, the entity is identified using an entity identifier and associated with a blockchain address. The verification request utilizes the associated blockchain address by verifying that a signature response from the entity was signed with the corresponding private key of the blockchain address. The result of the attribution verification is provided by a content provider that originally requested the attribution verification. In some embodiments, the process of FIG. 3 is performed at 203 and/or 205 of FIG. 2. In some embodiments, the process of FIG. 3 is performed by a blockchain-based content attribution verification service such as attribution verification service 131 of FIG. 1 at the request of a content provider such as content provider 111 of FIG. 1. In some embodiments, the blockchain used to store the public address is blockchain 121 of FIG. 1.

At 301, an identification of digital content for attribution verifications is received. For example, an identifier for or a reference to a digital asset such as an article, video, audio, social media post, or another form of digital content is received. The identification is received to identify the digital content that includes one or more attributions to be verified. In some embodiments, the identification of the digital content is received as part of an attribution verification request. Each attribution in the digital content is associated with an entity, such as an individual or organization, referenced by the attribution. Without additional verification of the attribution, it can be unclear to viewers whether the attribution is accurate. For example, the entity can confirm the authenticity of the attribution or declare that the attribution is false, providing additional context for the attribution.

At 303, contact identifiers for attributions are determined. For example, for each attribution, one or more entities are identified and for each identified entity, a contact identifier associated with the entity is determined. In some embodiments, the contact identifiers are determined by first analyzing the digital content. For example, the digital content can be analyzed to automatically identify attributions and the entities referenced in the identified attributions. As one example, a text-based document can be parsed to identify quotes and the entity (such as an individual or organization) that the quote is attributed to. As another example, a video can be analyzed using image processing techniques such as face and image recognition techniques to identify the individuals in the video. Similarly, an audio segment can be analyzed using voice analysis techniques to matched identified voices to individuals in the audio segment. Other types of attributions can be analyzed accordingly to identify the referenced entities in the corresponding attributions. For the relevant attributions, once the identities of the entities in the digital content are determined, a contact identifier is determined for each entity. In some embodiments, the contact information is retrieved from an entity contact database or registry that maps an entity to a contact identifier. In various embodiments, a contact identifier can include an email address, a social media account, a username, a messaging account, a phone number, an online address, a network address, an NFT identifier, or another contact identifier.

In some embodiments, the digital content does not require analysis and the entity requiring attribution verification is provided as part of the attribution verification request. For example, in some scenarios, an entity self identifies and is the one initiating the request for verification of an attribution referencing the entity in the digital content. In the event the entity is already provided as part of the attribution verification request, a contact identifier for the entity can be determined by utilizing an entity contact database or registry. In various embodiments, the entity contact database or registry is implemented by the content attribution verification service and/or by a third-party service and/or stored on a blockchain or public ledger.

In some embodiments, the identity of a referenced entity in an attribution is not found. For example, in some scenarios, the referenced entity cannot be identified, or the entity is identified but does not have a contact identifier. For example, the identity of an individual can be determined using image analysis techniques, but the individual may not have a method to validate the attribution using a blockchain address. In the event the identity of a referenced entity in an attribution is not found, the attribution request is not sent to the entity and the processing at 305 proceeds directly to 311 where a non-found result is provided. For example, in response to a non-found result, the digital content can annotate the attribution using a non-verified icon to indicate that the referenced entity was not found. In some embodiments, the non-verified icon is an interactive user interface icon that allows the referenced entity to verify the attribution, for example, in the event the referenced entity activates and configures a blockchain address for attribution verification.

At 305, a determination is made whether a contact identifier was found. In the event a contact identifier is found, processing proceeds to 307. In the event a contact identifier is not found, processing proceeds to 311.

At 307, verifications of attributions using contact identifiers are requested. For example, an attribution verification request is initiated for each entity and attribution by contacting the entity using the entity's contact identifier determined at 303. In some embodiments, an attribution verification request is initiated by sending an email, a social media post, an online message, a text message, a private network message, or via another form of communication to the entity by utilizing the entity's contact identifier. In some embodiments, the attribution verification request can include the digital content, such as a copy of the content or a reference to the content, as well as the attribution that the verification is requested for. The attribution can be described by referencing the portions of the digital content attributed to the entity. For example, an article can include the quotes and/or facts in the article that are attributed to the entity. As another example, a video or audio interview can include a reference to the digital content along with timestamps corresponding to the entity's appearance in the digital content. In some embodiments, the request includes a transcript of the contributions by or references to the entity. In some embodiments, an attribution for verification includes scenarios when an entity is mentioned or referenced in the digital content, for example, using a hashtag or another tagging or naming system.

At 309, the results of attribution verification requests are received. For example, the result of the attribution verification requests initiated at 307 are received. In some embodiments, the results can include a response by the entity. For example, the entity can respond by verifying the attribution and including a response, such as whether the attribution is true or false. In some embodiments, once received, the response is verified by validating a cryptographic signature provided by the entity. For example, a blockchain signature can be provided by the entity based on a public blockchain address to verify the identity and response of the entity. In various embodiments, the result of verifying the cryptographic signature indicates whether the attribution has been verified by the responding entity.

At 311, results of attribution verifications are provided. For example, the result of an attribution verification is provided to the host of the digital content and associated with the portion of the digital content related to the relevant attribution. The attribution verification results can include whether an attribution is true or false and, in some embodiments, can include one or more additional responses provided by the entity with respect to the attribution. In some embodiments, the result may include that the entity did not respond to the attribution verification request or that no contact information could be found for the entity. In various embodiments, the content provider can annotate the digital content using the results of attribution verifications. In some embodiments, the digital content is modified and/or updated by the content attribution verification service to include the results of attribution verifications. For example, the verified attributions can be embedded as annotations into the digital content and/or included as metadata in the digital content and the resulting annotated digital content is provided to the appropriate content provider.

Figure 4:
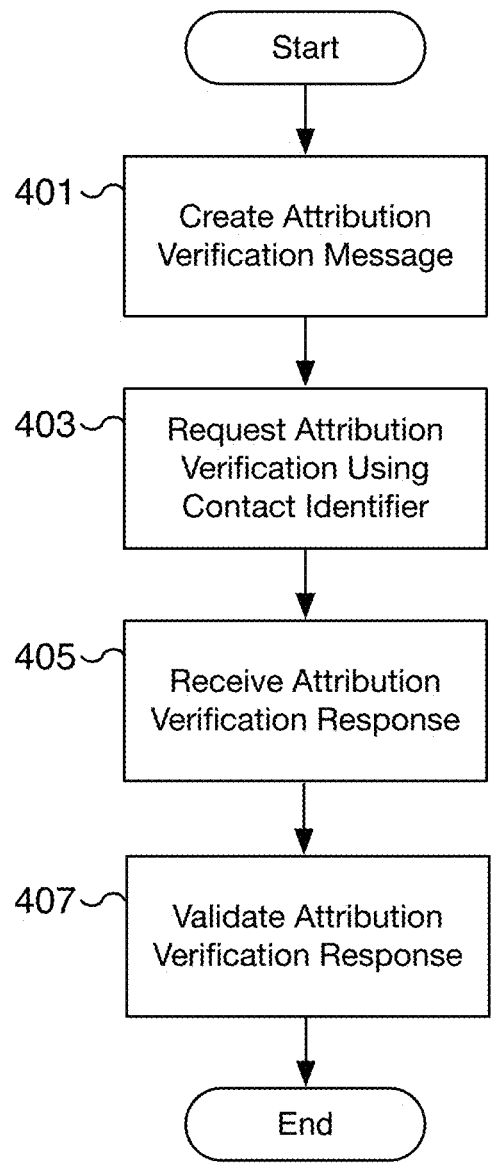
FIG. 4 is a flowchart illustrating an embodiment of a process for verifying a content attribution with the entity referenced.

FIG. 4 is a flowchart illustrating an embodiment of a process for verifying a content attribution with the entity referenced. For example, using the process of FIG. 4, a content attribution verification service notifies an entity referenced by a content attribution via the entity's contact identifier and requests that the entity verify the attribution. The content attribution verification service verifies the validity of the response to determine whether the verification is valid. In some embodiments, the process of FIG. 4 is performed at 203 and/or 205 of FIG. 2 and/or at 307 and/or 309 of FIG. 3. In some embodiments, the process of FIG. 4 is performed by a blockchain-based content attribution verification service such as attribution verification service 131 of FIG. 1 as part of responding to a request of a content provider such as content provider 111 of FIG. 1 by contacting the referenced entity of the attribution such as content contributor 141 of FIG. 1. In some embodiments, the blockchain used to store a public address of the entity used to verify the entity's response is blockchain 121 of FIG. 1.

At 401, an attribution verification message is created. For example, a message associated with the attribution verification is created. The message can include references to the digital content and the corresponding attribution. For example, the message can detail which portions of the digital content are being attributed to the referenced entity. In various embodiments, the message is used by the referenced entity to create a signature verifying the attribution. In some embodiments, the message references a public cryptographic address and/or cryptographic public key associated with the receiving entity, such as a registered blockchain address associated with the entity's cryptographic private key.

At 403, attribution verification is requested using a contact identifier. For example, the entity is sent the attribution verification message created at 401 as part of an attribution verification request. In some embodiments, the entity is asked to sign a version of the attribution verification message using a cryptographic private key associated with a blockchain address. For example, the receiving entity can verify the attribution verification message, append one or more responses to the attribution, such as whether the attribution is true or false and/or provide another response to the attribution, and provide a cryptographic signature verifying the entity's completed response to the attribution. In some embodiments, the attribution verification request is delivered to the entity using the entity's contact identifier. For example, the entity can be notified via an email address, a social media account, a messaging account, a phone number, a text message, an SMS message, a push notification, an online address, a network address, an NFT identifier, a tagging system, or another contact method.

In some embodiments, the notification to the entity of the attribution verification request includes the attribution verification message and the entity can provide its response and cryptographic signature directly. In some embodiments, the notification includes a link or reference to a service such as a web application service. Using the provided link, the entity can retrieve and respond to the attribution verification message. For example, the notification can include a web link that allows the entity to visit a web page that presents the digital content and attribution. Using a configured cryptographic wallet, the entity can provide its response and cryptographic signature to respond to the attribution verification request.

At 405, an attribution verification response is received. For example, a response to the attribution verification requested at 403 is received. In various embodiments, the response includes the entity's response to the attribution as well as a confirmation that the response is authentic and created by the entity. For example, the confirmation of authenticity can be a cryptographic signature signed by the entity using a private key associated with the entity's blockchain address. In some embodiments, the response includes one or more responses by the entity to provide context with respect to the entity's inclusion in the attribution. In some embodiments, the response further includes the time, date, location, and other response creation details. In some embodiments, the entity's response is written to the blockchain at least in part as proof of verification. For example, at least a portion of the entity's response, such as a cryptographic signature, can written to the blockchain. In some embodiments, the written blockchain data functions as proof of verification and/or can be accessed by any party at any future time to independently verify the attribution.

At 407, the attribution verification response is validated. For example, the response received at 405 is verified to be valid. In some embodiments, a confirmation of authenticity included in the response received, such as an included cryptographic signature, is evaluated to confirm that the signature was created using the entity's cryptographic private key that corresponds to the entity's blockchain address. In various embodiments, the attribution is verified by determining that the cryptographic signature associated with the entity is valid.

Figure 5:
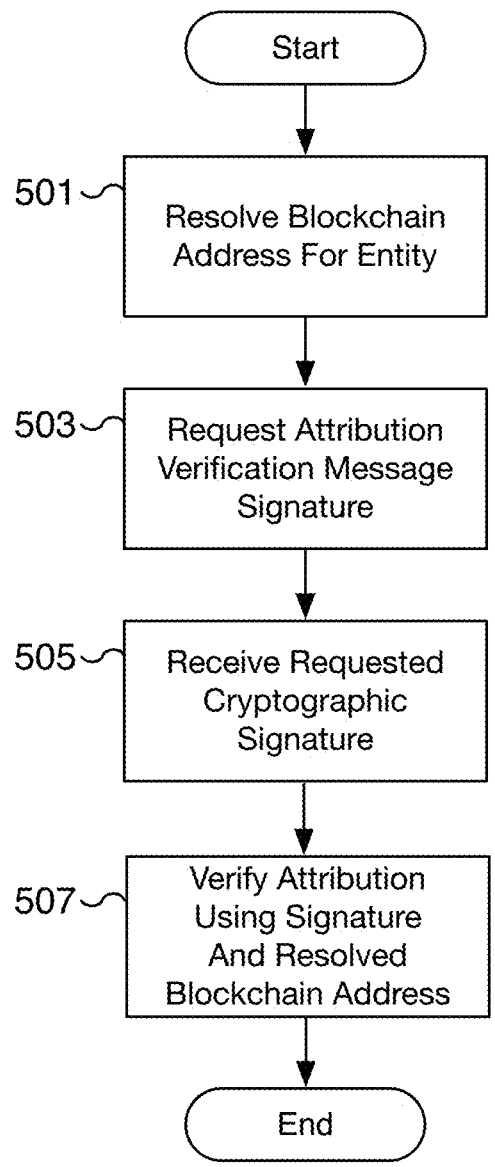
FIG. 5 is a flowchart illustrating an embodiment of a process for validating a blockchain content attribution verification request.

FIG. 5 is a flowchart illustrating an embodiment of a process for validating a blockchain content attribution verification request. Using the process of FIG. 5, a content attribution verification service validates a content attribution using a blockchain-based signature provided by the entity referenced. Using a contact identifier associated with the entity, a content attribution verification service requests that the entity provide a signature associated with the entity's blockchain address. The content attribution verification service validates that the signature was generated using the private cryptographic key corresponding to the public cryptographic address or public cryptographic key stored on the blockchain. In some embodiments, the process of FIG. 5 is performed at 203 and/or 205 of FIG. 2, at 307 and/or 309 of FIG. 3, and/or at 403 and/or 405 of FIG. 4. In some embodiments, the process of FIG. 5 is performed by a blockchain-based content attribution verification service such as attribution verification service 131 of FIG. 1 at the request of a content provider such as content provider 111 of FIG. 1 by contacting the referenced entity of the attribution such as content contributor 141 of FIG. 1. In some embodiments, the blockchain used to store the public address of the entity is blockchain 121 of FIG. 1.

At 501, a blockchain address for the entity is resolved. For example, using an identifier such as entity's contact identifier, a blockchain address for the entity is resolved. In some embodiments, a blockchain registry exists that maps an entity (or an identifier of the entity) to a blockchain address. For example, using the entity's contact identifier, a cryptographic address and/or cryptographic public key for the entity can be determined. In some embodiments, the entity is mapped to an NFT identifier such as an NFT domain, and the corresponding blockchain address is determined using the NFT identifier. In some embodiments, the resolution of the blockchain address utilizes a multi-layer blockchain. In various embodiments, the blockchain address is used to verify that a signature provided by the entity is valid and was signed using the corresponding cryptographic private key.

At 503, a cryptographic signature is requested for the attribution verification message. For example, a request is sent to the entity using the entity's contact identifier. The request includes the attribution verification message and requests that the entity provide a digital cryptographic signature responding to the attribution verification. In some embodiments, the signature is generated by the entity by signing the attribution verification message and/or a response to the message. For example, the response to the message can include a version of the original attribution verification message with the entity's response to the attribution, such as a confirmation that the attribution is true or false. In some embodiments, the response includes additional context provided by the entity. In various embodiments, the entity verifies the attribution using a cryptographic wallet signature. For example, the referenced entity can sign in agreement to the entity's response to the attribution using the entity's cryptographic wallet. In some embodiments, the agreement is signed and stored on the blockchain.

At 505, the requested cryptographic signature is received. In response to the request of 503, a cryptographic signature is received. In various embodiments, the signature is received along with the entity's response to the attribution. The signature is a cryptographic signature and is signed by the entity's cryptographic private key that corresponds to the blockchain address resolved at 501.

At 507, the attribution is verified using the received cryptographic signature and the resolved blockchain address. For example, the attribution is verified by confirming the received cryptographic signature is a valid signature signed using the cryptographic private key of the entity that corresponds to the blockchain address resolved at 501. In some embodiments, the corresponding cryptographic public key is used to verify the signature. Once the signature is verified as valid, the associated attribution, including any responses by the entity, are verified and can be used for annotating the attribution. In some embodiments, the validation is written to the blockchain. For example, the validation and/or at least a portion of the response received at 505, such as the received cryptographic signature used for verification of the attribution, is written to the blockchain. By writing data associated with the attribution verification to the blockchain, the written blockchain data can be used as proof of verification. For example, the validation data persisting on the blockchain can be used as proof of verification.

Figure 6:
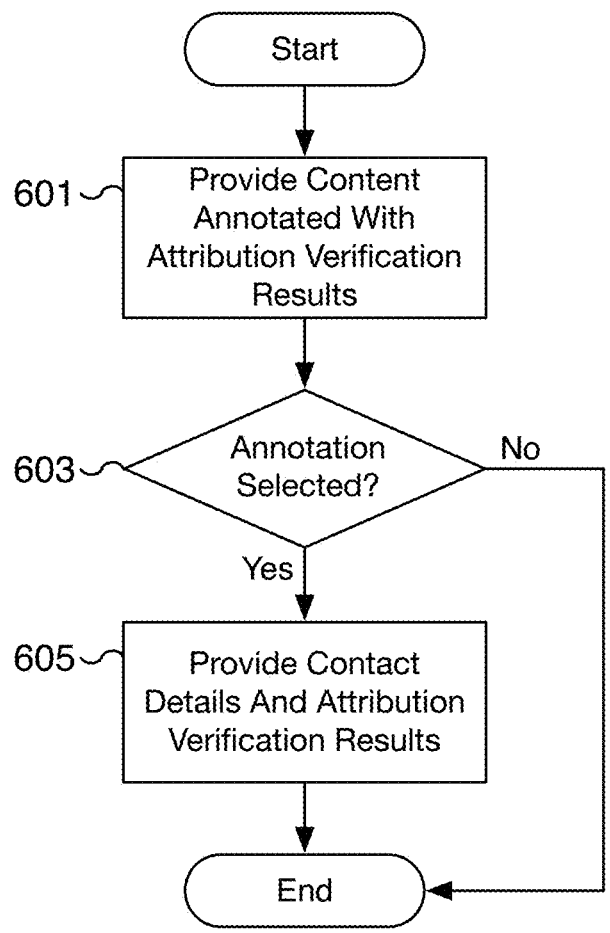
FIG. 6 is a flowchart illustrating an embodiment of a process for providing digital content with interactive verified attributions.

FIG. 6 is a flowchart illustrating an embodiment of a process for providing digital content with interactive verified attributions. For example, using the process of FIG. 6, a content provider hosting digital content annotated with attribution verification results provides the annotated content in an interactive format to users. As users view the annotated content, they can interact with the annotated attributions to determine how the entity referenced has responded to an attribution verification request. In some embodiments, the process of FIG. 6 is performed at 209 of FIG. 2. In some embodiments, the process of FIG. 6 is performed by a content provider such as content provider 111 of FIG. 1 to provide annotated attributes to clients such as client 101 of FIG. 1.

At 601, the content annotated with attribution results is provided. For example, a user of a media client is provided with digital content that has been annotated with the results from performing content attribution verifications. The format of the provided digital content can include a written format, a video format, an audio format, another media format, or a combination of different media formats. For example, the digital content can be an article, a social media post, a blog post, a social media message, a comment to another post, a calendar entry, an online video, an audio segment, a multimedia presentation, or another type of digital content. The annotations to the digital content can include content attributions that have not been verified as well as those that have been verified, and each type of attribute annotation can include a verified or non-verified user interface component, such as a verified or non-verified icon or cue for the attribution. In some embodiments, all verified attributions are attributions that the entity referenced agrees with or verifies as true or authentic. In some embodiments, verified attributions can include different responses from the referenced entity such as a declaration that the attribution is true, a declaration that the attribution is false, a "no comment" provided by the entity in response to the attribution, the type of contribution or role of the referenced entity, and/or another response provided by the entity in response to the attribution.

In various embodiments, the annotations are interactive, and a user can interact with an annotation to request additional information. For example, a user can hover and/or select an annotation to reveal additional information of the annotation. In some embodiments, the annotations are displayed as the media is consumed and additional details may be revealed about the annotation based on how the content is consumed. For example, in some embodiments, the annotations are automatically selected based on the consumption of the digital content and additional details regarding a content attribution annotation can be provided based on the auto-selection of the annotation. For example, for a content attribution in a video, additional details of the annotation can be provided during video playback when the video approaches the video segment associated with the annotation.

At 603, a determination is made whether an interactive annotation is selected. In the event an interactive annotation is selected, processing proceeds to 605. In the event an interactive annotation is not selected, no additional processing as it relates to an interactive verified annotation is performed. For example, the processing proceeds to the end of the process of FIG. 6 which may involve continuing to provide the annotated digital content to the user, such as providing any remainder, unwatched, unheard, or unread digital content.

At 605, contact details and attribution verification results are provided. For example, details of the entity referenced by the attribution can be provided. The details can include the entity's contact information, such as a social media account, an email address, a username, a website, an NFT identifier, an NFT domain, a location, an address, and/or other contact information. In some embodiments, the entity's contact information includes a profile of the entity and can include a reference to a profile page for the entity. In some embodiments, the contact information includes a reputation score for the entity, whether the entity's identity has been verified and by whom, a public cryptographic address of the entity, a history of past verifications, the ability to contact and/or communicate with the entity, and the ability to be notified of changes to the attribution verification.

In some embodiments, the provided details include additional information about the attribution and/or verification. For example, the verification can include one or more fixed or free-form responses provided by the referenced entity as part of the entity's verification response. Example responses may include a comment related to the attribution, a declaration that the attribution is true, a declaration that the attribution is false, additional context regarding the attribution, and/or another entity provided response. In some embodiments, the response is a free-form response that can include video and/or audio as well as a text response. In some embodiments, the additional details associated with the attribution can include the time and location of the entity's verification response and a cryptographic signature, among other details.

Figure 7:
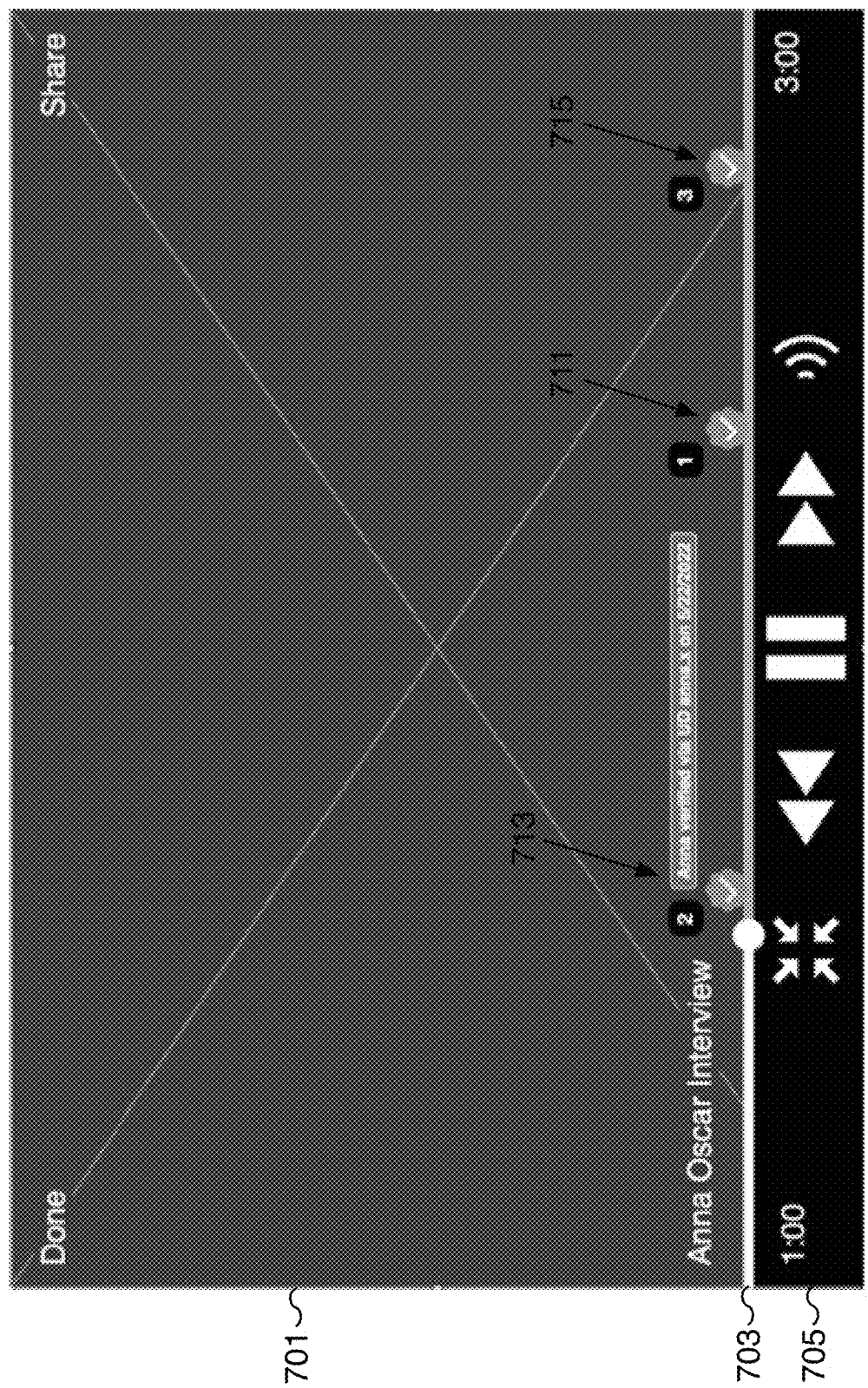
FIG. 7 is a diagram illustrating an embodiment of a user interface for a video annotated with interactive verified attributions.

FIG. 7 is a diagram illustrating an embodiment of a user interface for a video annotated with verified attributions. Using the processes of FIGS. 2-6, a content provider, such as content provider 111 of FIG. 1, can provide a client, such as client 101 of FIG. 1, a video annotated with verified attributions. In various embodiments, the attributions are verified using an attribution verification service such as attribution verification service 131 of FIG. 1 that relies on a blockchain such as blockchain 121 of FIG. 1. In the example shown, the user interface includes video playback portion 701, progress indicator 703, and video toolbar 705. In various embodiments, video playback portion 701 is a video playback user interface component that presents the annotated digital video to the user. In the example shown, the video image is replaced with a placeholder image. Overlayed on top of the video played using video playback portion 701 is the title of the video "Anna Oscar Interview" (in the lower left-hand corner) and interactive user interface components corresponding to a "Done" button (in the upper left-hand corner) and a "Share" button (in the upper right-hand corner).

In the example shown, three verified attributions 711, 713, and 715 are shown as annotations in progress indicator 703. Annotations 711, 713, and 715 are labeled 1-3, respectively, for description purposes and correspond to three different segments of the digital content with attributions. Each of annotations 711, 713, and 715 is shown using a verified attribution user interface component. In the example shown, the verified attribution user interface component is a verified icon with a checkmark that indicates that the attribution has been verified. Annotation 713 (numbered 2) is the first annotation in the video and is labeled with details of the verification ("Anna verified via UD anna.x on 5/22/2022). The verification details include the date the verification was made along with the identifier (the NFT domain "anna.x") used to verify attribution 713 and the entity's name ("Anna"). In some embodiments, the details of a verified attribution are presented when the video playback position reaches a segment that is annotated. For example, in FIG. 2, the video playback is at a position associated with annotation 713, causing the details of verification annotation 713 to be automatically displayed. In some embodiments, a user can interact with an annotation to reveal additional details such as the details shown with annotation 713. In some embodiments, a user can further interact with an annotation to reveal a profile page of the referenced entity.

In various embodiments, the diagram of FIG. 7 resembles the user interface shown to an entity referenced in attributions 711, 713, and 715 (i.e., Anna Oscar) prior to verifying the attributions. The corresponding user interface used for verifying annotations is shown with attributions but without the verified icons and allows the referenced entity to review and subsequently verify each attribution. For example, the attributions can each be shown annotated with an unverified icon. Once verified, the unverified icons are replaced with verified icons and users are presented with a user interface such as the diagram of FIG. 7 to consume the video with annotated verified attributions 711, 713, and 715.

Figure 8:
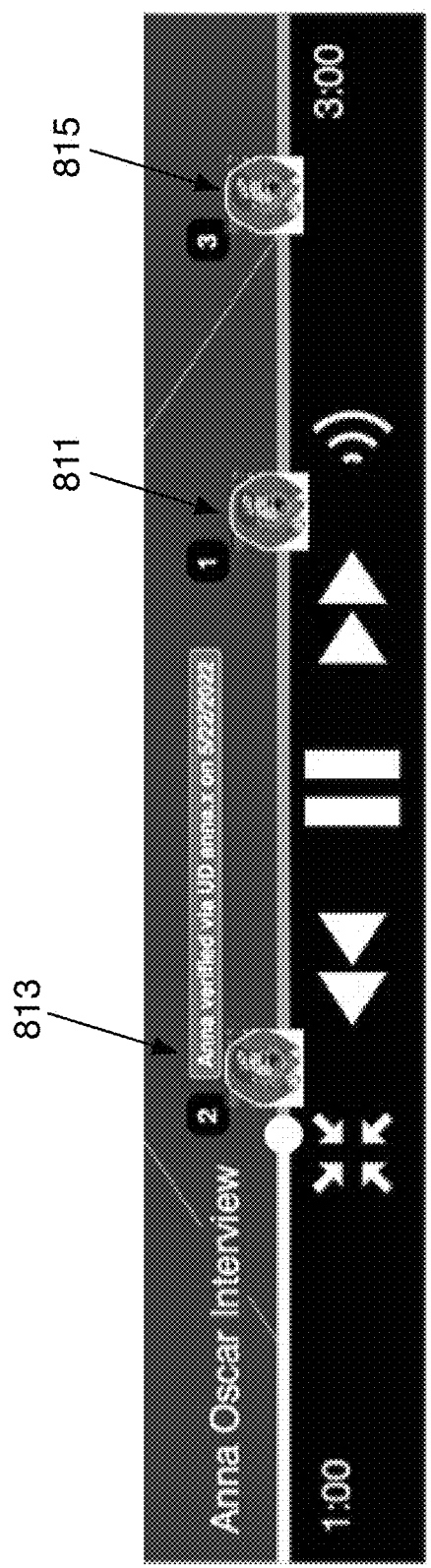
FIG. 8 is a diagram illustrating an embodiment of a user interface for a video annotated with interactive verified attributions.

FIG. 8 is a diagram illustrating an embodiment of a user interface for a video annotated with verified attributions. In the example shown, the user interface of FIG. 8 is a variation of the user interface of FIG. 7 for displaying a video with verified annotations using the processes of FIGS. 2-6 and annotations 811, 813, and 815 correspond to annotations 711, 713, and 715 of FIG. 7, respectively. Unlike the user interface of FIG. 7, the user interface of FIG. 8 includes verified profile icons for each annotated attribution. In the example shown, each of verified annotations 811, 813, and 815 (numbered 1-3) are attributed to the same entity (i.e., Anna Oscar). Users watching the video can quickly determine that annotations 811, 813, and 815 are attributed to the same entity since all three annotations share the same verified profile icon. In the event annotations 811, 813, and 815 were attributed to different entities, such as to a different individual for each attribution, the different verified profile icons for the different entities would be shown next to their corresponding annotations. In some embodiments, a verified profile icon can be configured for an entity by storing the icon or a reference to the icon on a blockchain. For example, an entity's verified profile icon or a reference to the icon can be stored on the blockchain and associated with the entity's blockchain address. In some embodiments, reference to an account associated with the entity, such as a social media account, is stored on the blockchain and a profile icon associated with the referenced account is used as the entity's verified profile icon.

Figure 9:
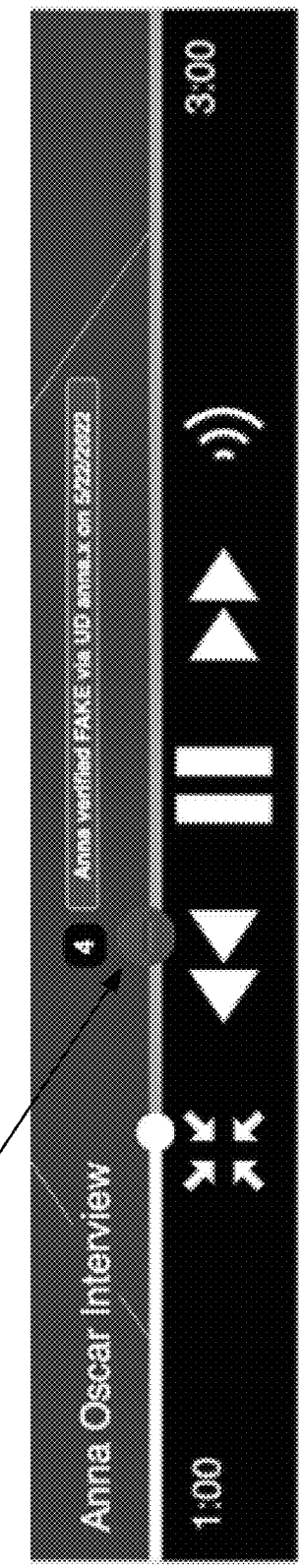
FIG. 9 is a diagram illustrating an embodiment of a user interface for a video annotated with interactive verified attributions.

FIG. 9 is a diagram illustrating an embodiment of a user interface for a video annotated with verified attributions. In the example shown, the user interface of FIG. 9 is a variation of the user interface of FIG. 7 for displaying a video with verified annotations using the processes of FIGS. 2-6. Unlike the user interface of FIG. 7, the user interface of FIG. 9 displays a different video than the video of FIG. 7 and the video of FIG. 9 includes a verified attribution where the entity referenced in the attribution (i.e., Anna Oscar) has previously verified that the attribution is false or a fake attribution. As shown in the example, annotation 917 (numbered 4) is a verified attribution and is shown with a fake attribution icon. Annotation 917 is labeled with details of the verification ("Anna verified FAKE via UD anna.x on 5/22/2022) and describes the associated attribution as a fake. For example, the associated video segment of annotation 917 can be a fake or deep fake of the referenced entity. In the example of FIG. 9, the referenced entity has reviewed the attribution and declared the corresponding content as fake. The attribution is verified since the referenced entity has provided a cryptographic signature along with the entity's verification response.

Figure 10:
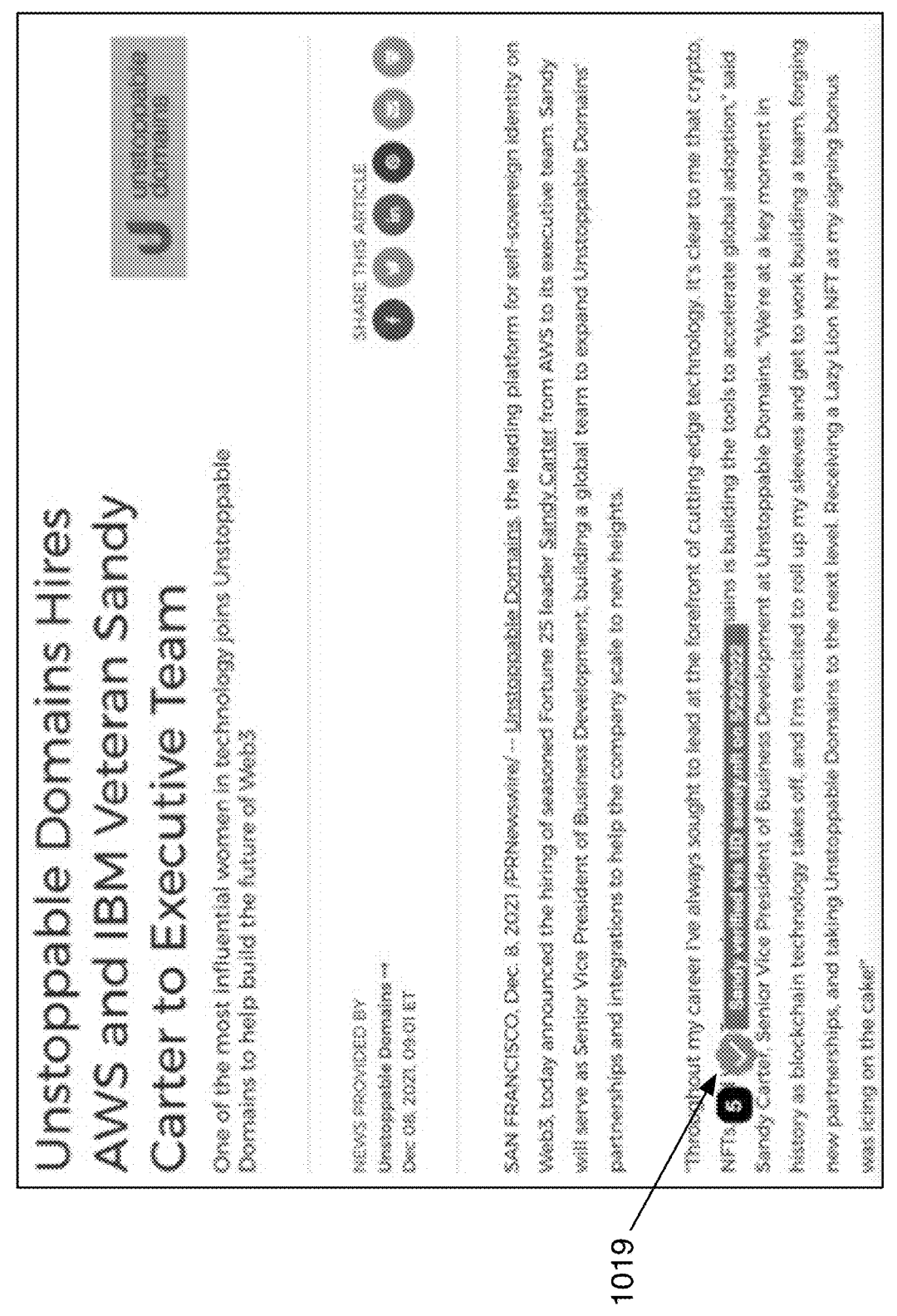

FIG. 10 is a diagram illustrating an embodiment of a user interface for an article annotated with verified attributions. Using the processes of FIGS. 2-6, a content provider, such as content provider 111 of FIG. 1, can provide a client, such as client 101 of FIG. 1, a text-based article annotated with verified attributions. In various embodiments, the attributions are verified using an attribution verification service such as attribution verification service 131 of FIG. 1 that relies on a blockchain such as blockchain 121 of FIG. 1.

In the example shown, an attribution in the article is shown as annotation 1019 and is numbered as annotation 5 for description purposes. Annotation 1019 is a verified attribution and is shown using a verified attribution user interface component. In the example shown, the verified attribution user interface component is a verified icon with a checkmark that indicates that the attribution has been verified. Annotation 1019 corresponds to a quote in the article attributed to Sandy Carter and is labeled with details of the verification ("Sandy verified via UD sandy.nft on 5/22/2022). The verification details include the date the verification was made along with the identifier (the NFT domain "sandy.nft") used to verify the attribution and the entity's name ("Sandy"). In some embodiments, the details of a verified attribution are presented when the user scrolls to reach a text portion that is annotated. In some embodiments, a user can interact with an annotation to reveal additional details such as the details shown with annotation 1019. In some embodiments, a user can further interact with an annotation to reveal a profile page of the referenced entity.

In various embodiments, the diagram of FIG. 10 resembles the user interface shown to the entity referenced in the attribution (i.e., Sandy Carter) prior to verifying the attribution. The corresponding user interface used for verifying annotation 1019 is shown with the attribution but without the verified icon and allows the referenced entity to review and subsequently verify the attribution. For example, the attribution can be shown annotated with an unverified icon. Once verified, the unverified icon is replaced with a verified icon and users are presented with a user interface such as the diagram of FIG. 10 to consume the article with verified attribution annotation 1019.

Figure 11:
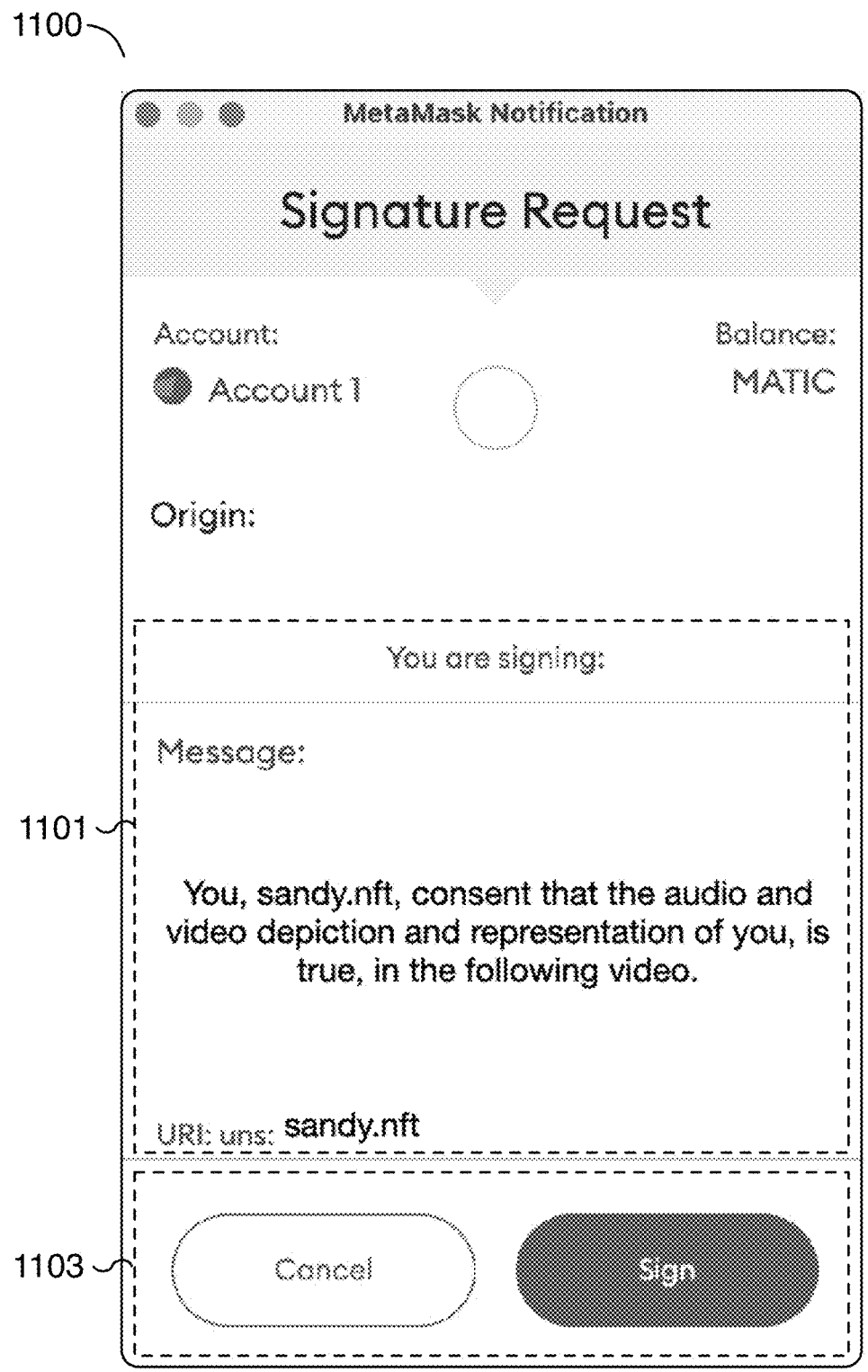
FIG. 11 is a diagram illustrating an embodiment of a user interface for verifying a content attribution with the entity referenced.

FIG. 11 is a diagram illustrating an embodiment of a user interface for verifying a content attribution with the entity referenced. In the example shown, signature request dialog 1100 includes message component 1101 and verification action component 1103 and is a user interface dialog provided to a content contributor to verify an attribution that references the content contributor entity. By selecting the "sign" action, the content contributor provides a cryptographic signature via a wallet configured with a blockchain cryptographic address for verifying the attribution in the corresponding digital content. In various embodiments, the signature is provided to an attribution verification service, which verifies the validity of the provided signature and can optionally store the validated signature on a blockchain as proof of verification. In some embodiments, the content contributor is content contributor 141 of FIG. 1, the blockchain is blockchain 121 of FIG. 1, the attribution verification service is attribution verification service 131 of FIG. 1, and the digital content is hosted by a content provider such as content provider 111 of FIG. 1. In some embodiments, signature request dialog 1100 is provided as part of a process for providing digital content with verified attributions using the processes of FIGS. 2-6.

In the example shown, a content contributor entity corresponding to "sandy.nft" is provided with signature request dialog 1100 to verify their consent to an annotation in digital content. Signature request dialog 1100 includes message component 1101 and verification action component 1103. In various embodiments, message component 1101 includes details of the annotation and the request for verification. For example, message component 1101 includes an example message "You, sandy.nft, consent that the audio and video depiction and representation of you, is true, in the following video." Message component 1101 also includes an identifier for the content contributor entity (e.g., "sandy.nft"). In various embodiments, message component 1101 can be scrolled to reveal additional information of the attribution such as the referenced digital content and/or a link to the referenced digital content. After reviewing message component 1101, the content contributor can verify the attribution by selecting the "sign" option of verification action component 1105. In various embodiments, the "sign" action allows the entity to provide a cryptographic digital signature using the configured wallet. In the example shown, signature request dialog 1100 is configured to use a MetaMask digital wallet for providing cryptographic signatures associated with the entity's blockchain cryptographic address.

Figure 12:
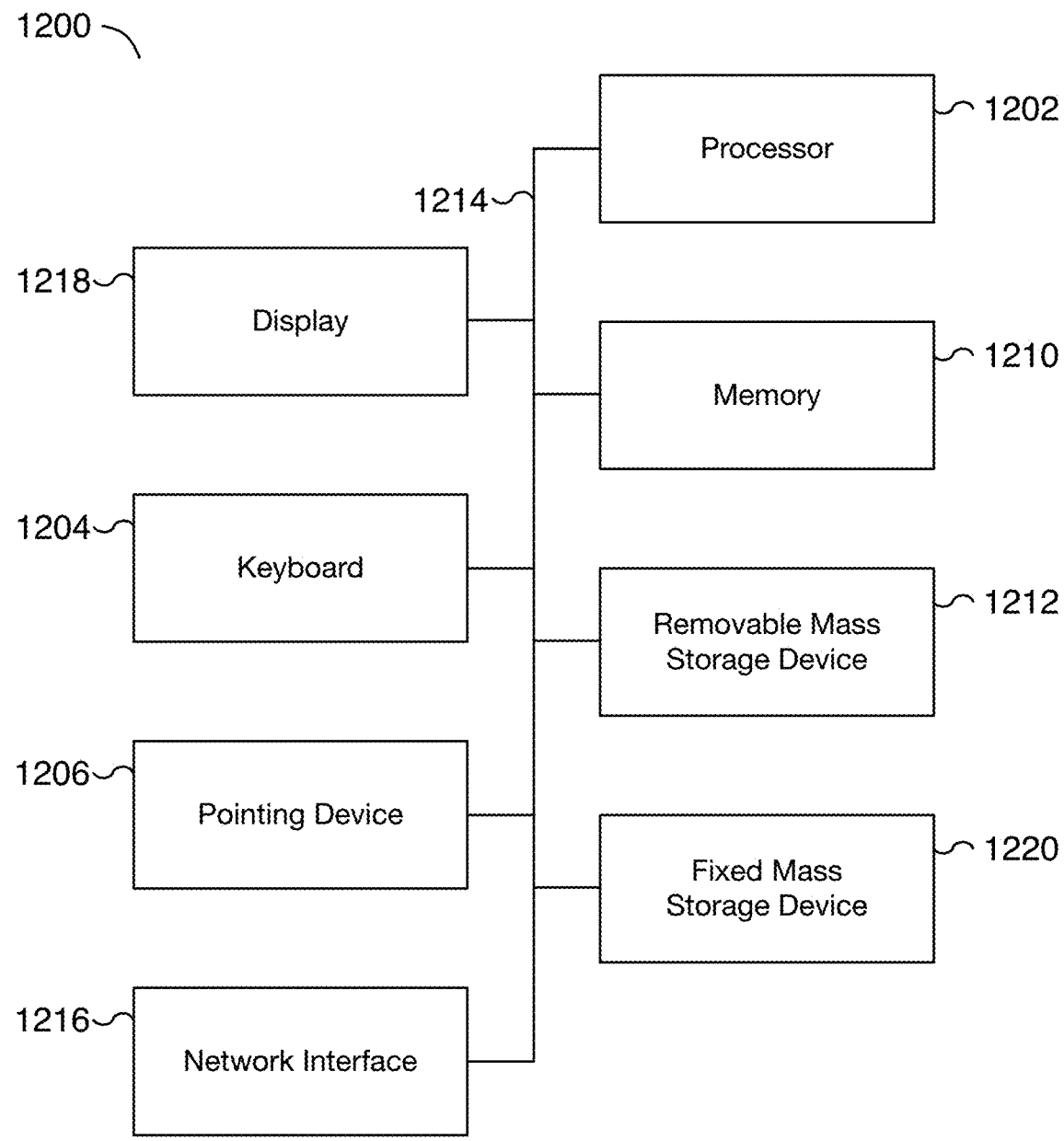
FIG. 12 is a functional diagram illustrating a programmed computer system for performing blockchain-based content attribution verification in accordance with some embodiments.

FIG. 12 is a functional diagram illustrating a programmed computer system for performing blockchain-based content attribution verification in accordance with some embodiments. As will be apparent, other computer system architectures and configurations can be utilized for performing blockchain-based content attribution verification. Examples of computer system 1200 include client 101 of FIG. 1, one or more computers included in content provider 111 of FIG. 1, one or more computers included in blockchain 121 of FIG. 1, one or more computers included in attribution verification service 131 of FIG. 1, and content contributor 141 of FIG. 1. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218). In various embodiments, one or more instances of computer system 1200 can be used to implement at least portions of the processes of FIGS. 2-6.

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data and objects used by the processor 1202 to perform its functions (e.g., programmed instructions). For example, memory 1210 can include any suitable computer-readable storage media, described below, depending on whether, for example, data access needs to be bi-directional or unidirectional. For example, processor 1202 can also directly and very rapidly retrieve and store frequently needed data in a cache memory (not shown).

A removable mass storage device 1212 provides additional data storage capacity for the computer system 1200, and is coupled either bi-directionally (read/write) or unidirectionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storages 1212, 1220 generally store additional programming instructions, data, and the like that typically are not in active use by the processor 1202. It will be appreciated that the information retained within mass storages 1212 and 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving an identification of digital content comprising an attribution to a subject entity, wherein the digital content is a text-based, an audio-based, or a video-based content;
    using a processor to determine a contact identifier associated with the subject entity;
    requesting using the contact identifier, that the subject entity provide a verification of an accuracy of the attribution for at least a portion of the digital content including by identifying a blockchain registry that maps the contact identifier to a blockchain address of a cryptographic token of the subject entity;
    receiving a declaration from the subject entity indicating whether the attribution has been verified, the declaration being cryptographically signed using a cryptographic signature associated with the subject entity;
    validating the cryptographic signature of the declaration, wherein validating the cryptographic signature includes cryptographically verifying that the cryptographic signature was generated using a private key corresponding to a public key for the cryptographic token of the subject entity corresponding to the blockchain address resolved from a blockchain registry that maps the contact identifier to the blockchain address;
    writing, to a blockchain, a persistent and auditable record of the verification, the record being associated with the received declaration from the subject entity and the validated cryptographic signature; and
    causing the indication to be provided in association with at least the portion of the digital content.

2. The method of claim 1, wherein the contact identifier is an email address, a phone number, a social media account, a username, or a non-fungible token identifier.

3. The method of claim 1, wherein the cryptographic signature is created using a cryptographic private key associated with a blockchain address.

4. The method of claim 1, wherein the cryptographic signature is created using a cryptographic wallet configured with a private key associated with a blockchain address.

5. The method of claim 1, wherein the attribution is associated with a segment of the digital content.

6. The method of claim 1, wherein the attribution is based on a hashtag of the entity associated with the digital content.

7. The method of claim 1, wherein the indication associated with whether the attribution has been verified includes a response provided by the subject entity.

8. The method of claim 7, wherein the response is associated with a declaration that the attribution is true or a declaration that the attribution is false.

9. The method of claim 7, wherein the response describes a type of contribution of the subject entity or a role of the subject entity with respect to the digital content.

10. The method of claim 7, wherein the response is persisted on the blockchain.

11. A system, comprising:
    one or more processors; and
    a memory coupled to the one or more processors, wherein the memory is configured to provide the one or more processors with instructions which when executed cause the one or more processors to:

receive an identification of digital content comprising an attribution to a subject entity, wherein the digital content is a text-based, an audio-based, or a video-based content;

determine a contact identifier associated with the subject entity;

request using the contact identifier, that the subject entity provide a verification of an accuracy of the attribution for at least a portion of the digital content including by identifying a blockchain registry that maps the contact identifier to a blockchain address of a cryptographic token of the subject entity;

receive a declaration from the subject entity indicating whether the attribution has been verified, the declaration being cryptographically signed using a cryptographic signature associated with the subject entity;

validate the cryptographic signature of the declaration, wherein validating the cryptographic signature includes cryptographically verifying that the cryptographic signature was generated using a private key corresponding to a public key for the cryptographic token of the subject entity corresponding to the blockchain address resolved from a blockchain registry that maps the contact identifier to the blockchain address;

write, to a blockchain, a persistent and auditable record of the verification, the record being associated with the received declaration from the subject entity and the validated cryptographic signature; and cause the indication to be provided in association with at least the portion of the digital content.

12. The system of claim 11, wherein the contact identifier is an email address, a phone number, a social media account, a username, or a non-fungible token identifier.

13. The system of claim 11, wherein the cryptographic signature is created using a cryptographic private key associated with a blockchain address.

14. The system of claim 11, wherein the cryptographic signature is created using a cryptographic wallet configured with a private key associated with a blockchain address.

15. The system of claim 11, wherein the attribution is associated with a segment of the digital content.

16. The system of claim 11, wherein the attribution is based on a hashtag of the entity associated with the digital content.

17. The system of claim 11, wherein the indication associated with whether the attribution has been verified includes a response provided by the subject entity.

18. The system of claim 17, wherein the response describes a type of contribution of the subject entity or a role of the subject entity with respect to the digital content.

19. A method, comprising:

receiving an identification of digital content comprising an attribution to a subject entity;

using a processor to determine a contact identifier associated with the subject entity, wherein the contact identifier is an email address, a phone number, a social media account, a username, or a non-fungible token identifier;

requesting using the contact identifier, that the subject entity provide a verification of an accuracy of the attribution for at least a portion of the digital content including by identifying a blockchain registry that maps the contact identifier to a blockchain address of a cryptographic token of the subject entity;

receiving a declaration from the subject entity indicating whether the attribution has been verified, the declaration being cryptographically signed using a cryptographic signature associated with the subject entity;

validating the cryptographic signature of the declaration, wherein validating the cryptographic signature includes cryptographically verifying that the cryptographic signature was generated using a private key corresponding to a public key for the cryptographic token of the subject entity corresponding to the blockchain address resolved from a blockchain registry that maps the contact identifier to the blockchain address;

writing, to a blockchain, a persistent and auditable record of the verification, the record being associated with the received declaration from the subject entity and the validated cryptographic signature; and causing the indication to be provided in association with at least the portion of the digital content.

20. The method of claim 19, wherein the indication associated with whether the attribution has been verified includes a response that describes a type of contribution of the subject entity or a role of the subject entity with respect to the digital content.

* * * * *